US010691228B2

(12) United States Patent
Bae et al.

(10) Patent No.: US 10,691,228 B2
(45) Date of Patent: Jun. 23, 2020

(54) ELECTRONIC DEVICE HAVING TOUCH SENSOR AND METHOD OF DRIVING THE SAME

(71) Applicant: LG DISPLAY CO., LTD., Seoul (KR)

(72) Inventors: Sanghyuck Bae, Paju-si (KR); Cheolse Kim, Daegu (KR)

(73) Assignee: LG DISPLAY CO., LTD., Seoul (KR)

(*) Notice: Subject to any disclaimer, the term of this patent is extended or adjusted under 35 U.S.C. 154(b) by 303 days.

(21) Appl. No.: 15/837,459

(22) Filed: Dec. 11, 2017

(65) Prior Publication Data

US 2018/0164909 A1 Jun. 14, 2018

(30) Foreign Application Priority Data

Dec. 13, 2016 (KR) ........................ 10-2016-0169833

(51) Int. Cl.
*G06F 3/044* (2006.01)
*G06F 3/0354* (2013.01)
*G06F 3/041* (2006.01)
*G06F 3/038* (2013.01)
*G06F 3/0488* (2013.01)

(52) U.S. Cl.
CPC ........ *G06F 3/03545* (2013.01); *G06F 3/0383* (2013.01); *G06F 3/044* (2013.01); *G06F 3/0416* (2013.01); *G06F 3/0488* (2013.01)

(58) Field of Classification Search
CPC .... G06F 3/03545; G06F 3/044; G06F 3/0416; G06F 3/0383; G06F 3/0488; G06F 2203/04103; G06F 3/0412
See application file for complete search history.

(56) References Cited

U.S. PATENT DOCUMENTS

| 2013/0069894 | A1* | 3/2013 | Chen | G06F 3/0412 345/173 |
| 2013/0176251 | A1* | 7/2013 | Wyatt | G06F 3/0416 345/173 |
| 2014/0062899 | A1* | 3/2014 | Lee | G06F 3/0416 345/173 |
| 2014/0132560 | A1* | 5/2014 | Huang | G06F 3/044 345/174 |
| 2014/0198093 | A1* | 7/2014 | Nambi | G09G 3/36 345/212 |
| 2015/0355762 | A1* | 12/2015 | Tripathi | G06T 1/20 345/173 |
| 2016/0092010 | A1* | 3/2016 | Agarwal | G06F 3/0412 345/173 |
| 2016/0116997 | A1* | 4/2016 | Kim | G06F 3/03545 345/174 |

(Continued)

*Primary Examiner* — Carolyn R Edwards
(74) *Attorney, Agent, or Firm* — Birch, Stewart, Kolasch & Birch, LLP

(57) ABSTRACT

An electronic device having a touch sensor and a method of driving the same are disclosed. The electronic device includes a display panel having a touch screen, a touch driver configured to drive the touch screen, a timing controller configured to control the display panel and the touch driver, and a stylus pen configured to provide a signal to the touch screen. The timing controller, in order to synchronize with the stylus pen, generates and outputs a control signal having an extended vertical blanking period in which a vertical blanking period is extended, and a display driving period and a touch sensor driving period which alternate in two or more times for one frame.

11 Claims, 11 Drawing Sheets

(56) References Cited

U.S. PATENT DOCUMENTS

| | | | |
|---|---|---|---|
| 2016/0179226 A1* | 6/2016 | Shepelev | G06F 3/044 345/174 |
| 2016/0370915 A1* | 12/2016 | Agarwal | G06F 3/0416 |
| 2017/0192534 A1* | 7/2017 | Han | G06F 3/0383 |
| 2017/0192591 A1* | 7/2017 | Jang | G06F 3/03545 |
| 2018/0059868 A1* | 3/2018 | Brahma | G06F 3/0418 |
| 2018/0095553 A1* | 4/2018 | Birenberg | G06F 3/0416 |
| 2018/0188832 A1* | 7/2018 | Coppin | G06F 3/0383 |

* cited by examiner

ELECTRONIC DEVICE HAVING TOUCH SENSOR AND METHOD OF DRIVING THE SAME

This application claims the priority benefit of Korean Patent Application No. 10-2016-0169833, filed on Dec. 13, 2016 in the Republic of Korea, which is incorporated herein by reference for all purposes as if fully set forth herein.

BACKGROUND OF THE INVENTION

Field of the Invention

The present disclosure relates to an electronic device having a touch sensor and a method of driving the same.

Discussion of the Related Art

A user interface (UI) enables a person (user) to easily control various electronic devices as his or her wishes. Typical examples of the user interface include a keypad, a keyboard, a mouse, an on screen display (OSD), and a remote controller having infrared communication or radio frequency (RF) communication functions. User interface technology has been developed to enhance the user's sensibility and ease of operation. The user interface is evolving into touch UI, voice recognition UI, 3D UI and so on.

The touch UI can use a touch screen implemented in a display panel of a display device. The touch screen may also be implemented as a technique (hereinafter, referred to as "an in-cell touch sensor") of embedding a touch sensor in a pixel array of a display panel. The touch screen may be a capacitive touch screen. When a finger or a conductive material touches (or approaches) the touch sensor, a touch screen having a capacitive touch sensor senses a touch input by sensing change in capacitance, that is, an amount of change in charge of the touch sensor due to an input of a touch screen driving signal.

The capacitive touch sensor may be implemented as a self capacitance sensor or a mutual capacitance sensor. Electrodes of the capacitive sensor may be connected in a one-to-one relationship with sensor wirings formed along one direction. The mutual capacitance sensor may be formed at an intersection of sensor wirings orthogonal to each other with the dielectric layer interposed therebetween.

Portable information devices such as a smart phone and a smart book use a stylus pen as well as a finger as a human interface device (HID). The stylus pen has an advantage that it can input more finely than the finger. The stylus pen may be classified into a passive type and an active type.

Although the stylus pen has the above advantage, some devices cause problems such as a touch input error (or a recognition error) or a coordinate calculation error because driving frequency or driving cycle of the display panel is not matched and need to be improved.

SUMMARY OF THE INVENTION

In one aspect, there is provided an electronic device having a touch sensor including a display panel, a touch driver, a timing controller, and a stylus pen. The display panel has a touch screen. The touch driver drives the touch screen. The timing controller controls the display panel and the touch driver. The stylus pen provides a signal to the touch screen. The timing controller, in order to synchronize with the stylus pen, generates and outputs a control signal having an extended vertical blanking period in which a vertical blanking period is extended, and a display driving period and a touch sensor driving period which alternate in two or more times for one frame.

In another aspect, there is provided a method of driving an electronic device having a touch sensor including a display panel having a touch screen, a touch driver configured to drive the touch screen, a timing controller configured to control the display panel and the touch driver, and a stylus pen configured to provide a signal to the touch screen. The method of driving the electronic device having a touch sensor includes when the stylus pen is positioned on the touch screen and frame video data is input from outside, storing the frame video data in a frame memory, and generating and outputting a control signal for synchronization with the stylus pen. The control signal has an extended vertical blanking period in which a vertical blanking period is extended and a display driving period and a touch sensor driving period which alternate in two or more times for one frame.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Hereinafter, detailed embodiments of the invention will be described with reference to the accompanying drawings.

An electronic device having a touch sensor according to an embodiment of the invention is implemented as a television, a set-top box, a navigation device, a video player, a Blu-ray player, a personal computer (PC), a home theater and a smart phone. The electronic device having a touch sensor according to an embodiment of the invention includes a touch screen implemented with capacitive type touch sensors. The touch screen may be formed by a self capacitance method or a mutual capacitance method. In addition, an electronic device having a touch sensor described below includes a display panel having a touch sensor and a stylus pen that provides a signal to the touch sensor. All the components of the electronic device having a touch sensor according to all embodiments of the invention are operatively coupled and configured.

Figure 1:
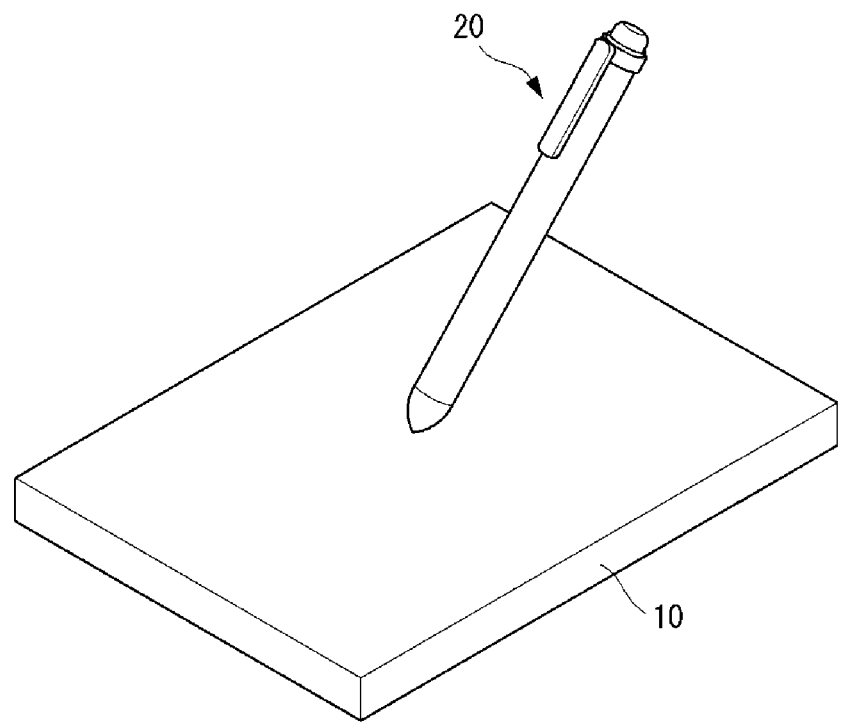
FIG. 1 schematically illustrates an electronic device having a touch sensor and a stylus pen.
Figure 2:
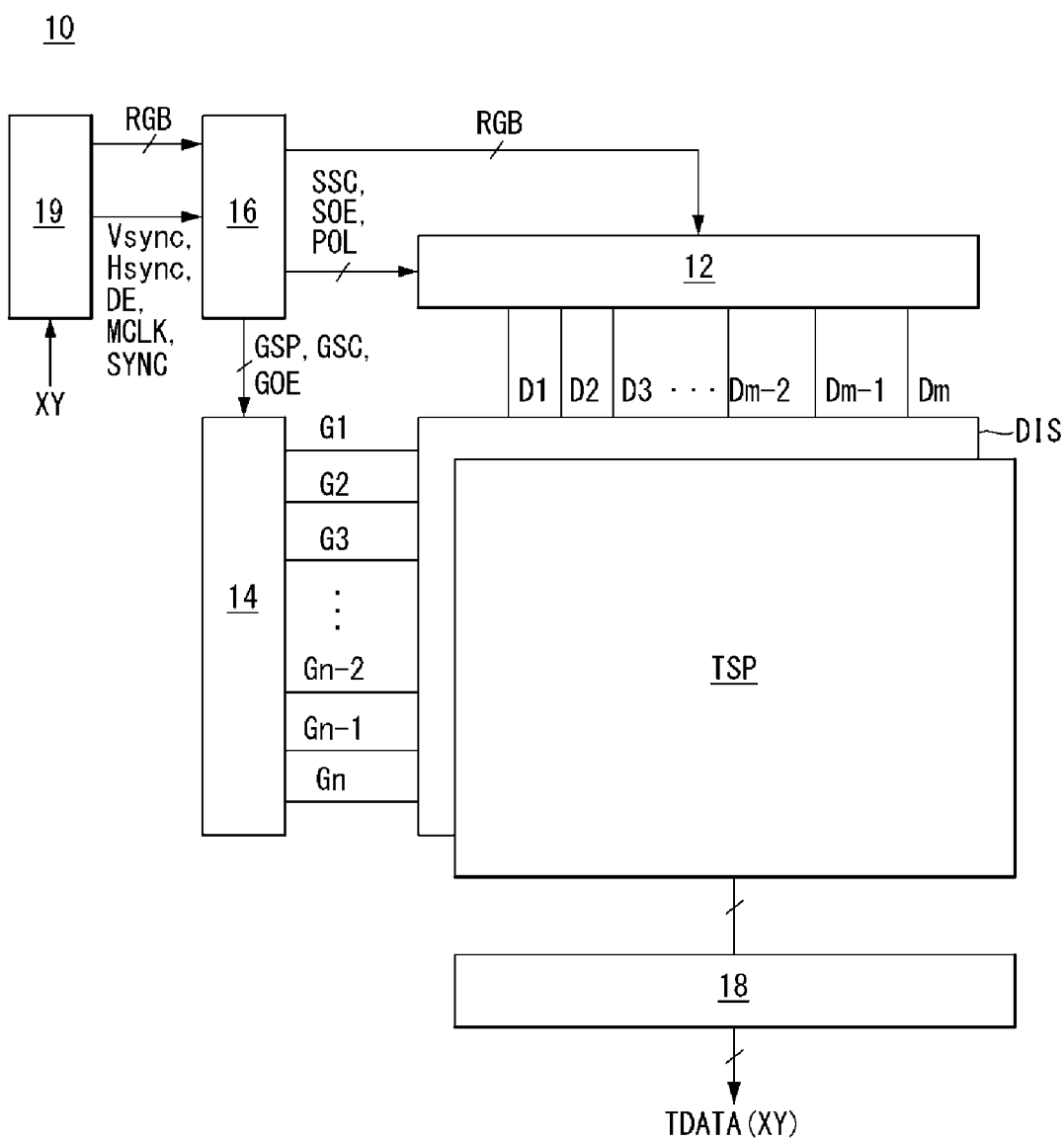
FIG. 2 illustrates an electronic device having a touch sensor.
Figure 3:
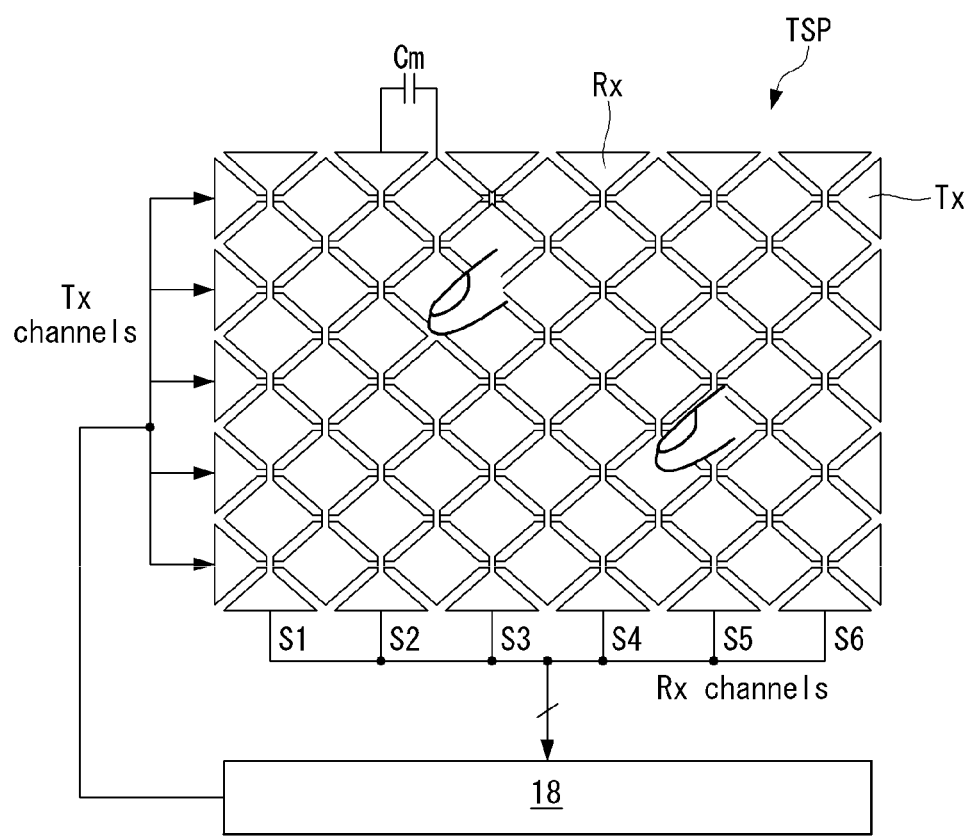
FIG. 3 is an exemplary diagram illustrating a touch screen implemented by a mutual capacitance sensor.
Figure 4:
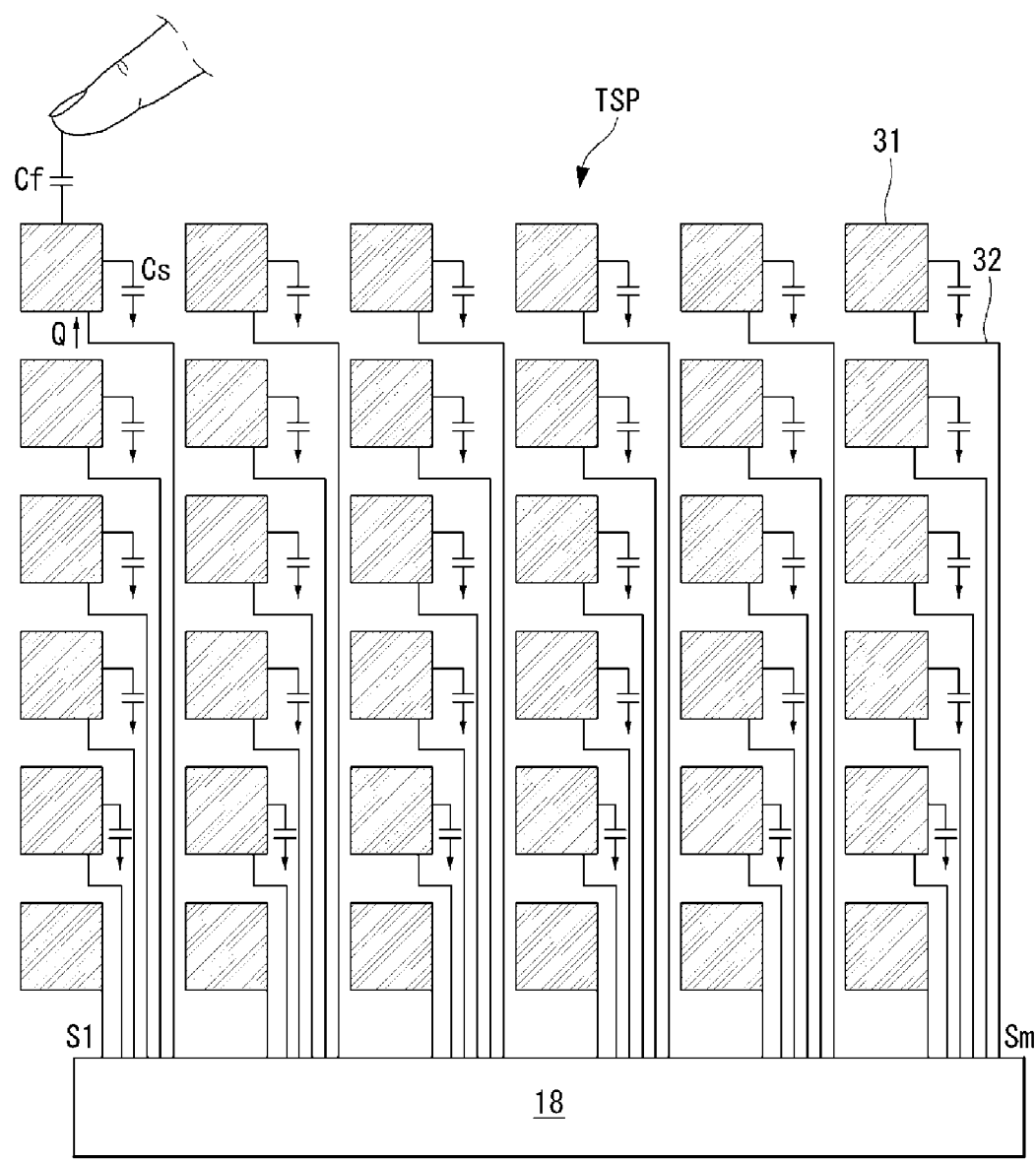
FIG. 4 is an exemplary diagram illustrating a touch screen implemented by a self capacitance sensor.

FIG. 1 schematically illustrates an electronic device having a touch sensor and a stylus pen. FIG. 2 illustrates an electronic device having a touch sensor. FIG. 3 is an exemplary diagram illustrating a touch screen implemented by a mutual capacitance sensor. FIG. 4 is an exemplary diagram illustrating a touch screen implemented by a self capacitance sensor.

As shown in FIG. 1, an electronic device 10 having a touch sensor can use a stylus pen 20 as well as a human finger as a human interface device (HID). The stylus pen 20 is configured to provide a signal to a touch screen. The electronic device 10 having a touch sensor is capable of detection touch by contact of a conductive object such as a finger or the stylus pen 20, and a capacitive touch screen is integrated into the electronic device 10.

The electronic device 10 having a touch sensor may be implemented on the basis of a flat panel display device such as a liquid crystal display (LCD), a field emission display (FED), a plasma display panel (PDP), a light emitting diode (LED) display, and an electrophoresis display (EPD) device.

In the following embodiments, the display device is implemented as the liquid crystal display, but the display device of the invention is not limited to the technique. In addition, a touch screen is implemented as a technique (hereinafter, referred to as "an in-cell touch sensor") of embedding a touch sensor in a pixel array of a display panel, but the display device of the invention is not limited to the liquid crystal display.

As shown in FIGS. 2 to 4, the electronic device 10 having a touch sensor includes a display module and a touch module. The display module may include a display panel DIS, a display driver 12, 14, and 16, and a host system 19. The touch module may include a touch screen TSP and a touch driver 18 configured to drive the touch screen TSP.

The electronic device 10 having a touch sensor drives a display driving period for displaying an image on the display panel DIS and a touch sensor driving period for sensing the touch screen TSP in a time division manner. Hereinafter, a device included in the display module and the touch module will be described.

The display panel DIS includes a liquid crystal layer formed between two substrates. The pixel array of the display panel DIS includes pixels formed in a pixel region defined by data lines (D1 to Dm, where m is a positive integer) and gate lines (G1 to Gn, where n is a positive integer). Each of the pixels includes thin film transistors (TFTs) formed at intersections of the data lines D1 to Dm and the gate lines G1 to Gn, a pixel electrode for charging a data voltage, a storage capacitor Cst connected to the pixel electrode for maintaining a voltage of a liquid crystal cell, and the like.

A black matrix, a color filter, and the like may be formed on an upper substrate of the display panel DIS. A lower substrate of the display panel DIS may be implemented as a color filter on TFT (COT) structure. In this instance, the black matrix and the color filter may be formed on the lower substrate of the display panel DIS. A common electrode to which a common voltage is supplied may be formed on the upper substrate or the lower substrate of the display panel DIS. On the upper substrate and the lower substrate of the display panel DIS, a polarizing plate is attached, and an alignment layer for forming a pre-tilt angle of a liquid crystal is formed on an inner surface in contact with the liquid crystal. A column spacer for maintaining a cell gap of the liquid crystal cell is formed between the upper substrate and the lower substrate of the display panel DIS.

A backlight unit may be disposed under a back surface of the display panel DIS. The backlight unit is implemented as an edge type backlight unit or a direct type backlight unit, and irradiates the display panel DIS with light. The display panel DIS may be implemented in any known liquid crystal mode such as Twisted Nematic (TN) mode, Vertical Alignment (VA) mode, In Plane Switching (IPS) mode, and Fringe Field Switching (FFS) mode.

The display driver includes a data driver 12, a gate driver 14 and a timing controller 16 configured to control the display panel DIS and a touch driver 18 and writes digital video data RGB to the pixels of the display panel DIS. The data driver 12 converts the digital video data RGB input from the timing controller 16 into an analog positive/negative gamma compensation voltage to output a data voltage. The data voltage output from the data driver 12 is supplied to the data lines D1 to Dm. The gate driver 14 sequentially supplies a gate pulse (or a scan pulse) synchronized with the data voltage to the gate lines G1 to Gn to select a pixel line of the display panel DIS to which the data voltage is written. The gate driver 14 may be arranged together with the pixels on the substrate of the display panel DIS.

The timing controller 16 receives timing signals such as a vertical synchronization signal Vsync, a horizontal synchronization signal Hsync, a data enable signal DE, a main clock MCLK and a synchronization signal SYNC input from the host system 19, and synchronizes operation timings of the data driver 12 and the gate driver 14. A scan timing control signal includes a gate start pulse GSP, a gate shift clock GSC, a gate output enable signal GOE, and the like. A data timing control signal includes a source sampling clock SSC, a polarity control signal POL, a source output enable signal SOE, and the like.

The host system 19 may transmit the timing signals Vsync, Hsync, DE, MCLK, SYNC together with the digital video data RGB to the timing controller 16, and may execute an application program associated with touch coordinate information XY input from the touch driver 18. The host system 19 means a system body of an electronic device to which the device of the invention is applicable. For example, the host system 19 may be selected from any one of a phone system, a television system, a set top box, a navigation system, a DVD player, a Blu-ray player, a personal computer (PC), and a home theater system. The host system 19 may transmit the digital video data RGB of an input image to the timing controller 16, and may receive touch input data TDATA (XY) from the touch driver 18 and execute an application associated with the touch input data.

The touch screen TSP may be implemented in a capacitive manner to sense a touch input through a plurality of capacitive sensors. The touch screen TSP includes a plurality of touch sensors having a capacitance. The capacitance may be divided into self capacitance and mutual capacitance.

The self capacitance may be formed along a conductor wiring of a single layer formed in one direction, and the mutual capacitance may be formed between two orthogonal conductor wirings. The touch screen TSP may be bonded on an upper polarizing plate of the display panel DIS or between the upper polarizing plate and the upper substrate of the display panel DIS. In addition, the touch sensors Cm or Cs of the touch screen TSP may be embedded in the pixel array of the display panel DIS.

As shown in FIG. 3, the touch screen TSP implemented by a mutual capacitance sensor Cm may include Tx electrode lines, Rx electrode lines intersecting the Tx electrode lines, and touch sensors Cm formed at intersections of the Tx electrode lines and the Rx electrode lines. The Tx electrode lines are driving signal wirings that apply a touch screen driving signal to each of the touch sensors Cm to supply electric charges to the touch sensors. The Rx electrode lines are sensor wirings that are connected to the touch sensors Cm to supply the charges of the touch sensors to the touch driver 18.

A mutual capacitance sensing method can know a touch input by supplying electric charge to a touch sensor Cm by applying the touch screen driving signal to a Tx electrode through a Tx electrode line in Tx channels, and sensing capacitance change of the touch sensor Cm through an Rx electrode and an Rx electrode line in Rx channels in synchronization with the touch screen driving signal, the sensed capacitance change is supplied to the touch driver 18 through respective signal selection line S1 to S5.

As shown in FIG. 4, in the touch screen TSP implemented by a self capacitance sensor Cs, each of touch electrodes 31 may be connected in a one-to-one relationship with the sensor wirings 32 formed along one direction. The self capacitance sensor Cs includes a capacitance formed in each of the electrodes 31. In a self capacitance sensing method, when a touch screen driving signal is applied to the electrode 31 through the sensor wiring 32, electric charge Q is accumulated in the touch sensor Cs. At this time, when a finger or a conductive object contacts the electrode 31, a parasitic capacitance Cf is formed in addition to the self capacitance sensor Cs to change the total capacitance value. If the capacitance value is changed between the finger-touched sensor and the non-touched sensor, an amount of charge sensed by the touch sensors is changed, thereby determining whether or not to be touched.

The touch driver 18 senses an amount of change in charge of the touch sensor before and after touching to determine whether or not the conductive material such as the finger or the stylus pen 20 is touched and its position. To this end, the touch driver 18 includes a driver IC (DIC) and a touch IC (TIC). The driver IC (DIC) outputs and senses a touch driving voltage for driving the touch screen TSP.

The driver IC (DIC) transmits the sensed sensing value to the touch IC (TIC). The touch IC (TIC) detects an amount of change in charge before and after the touch input based on the sensed value, compares the amount of change in charge with a predetermined threshold value, and determines positions of the touch sensors having the amount of change in charge equal to or larger than the threshold value as a touch input area. The touch IC (TIC) calculates coordinate for each touch input and transmits the touch data (TDATA (XY)) including touch input coordinate information to an external host system.

Figure 5:
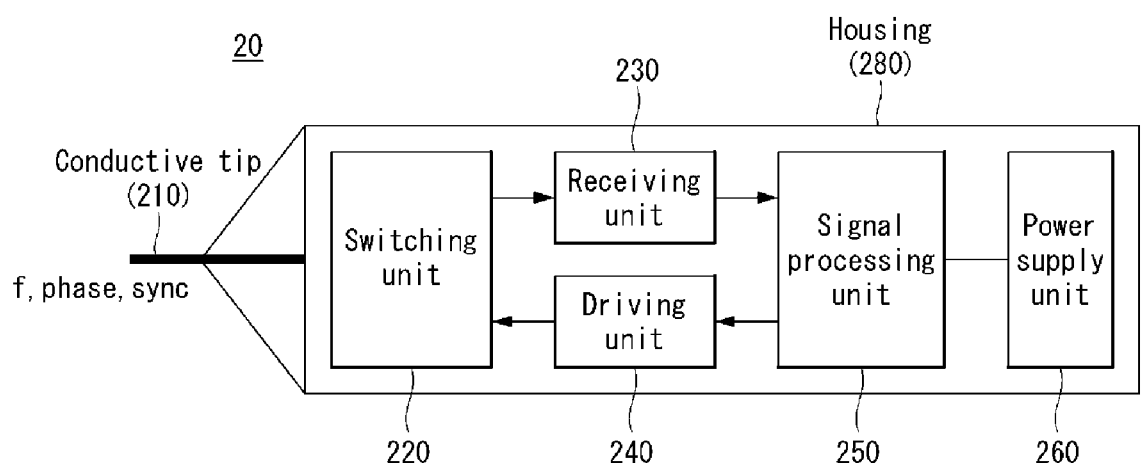
FIG. 5 is a diagram illustrating schematically a configuration of an active stylus pen.
Figure 6:
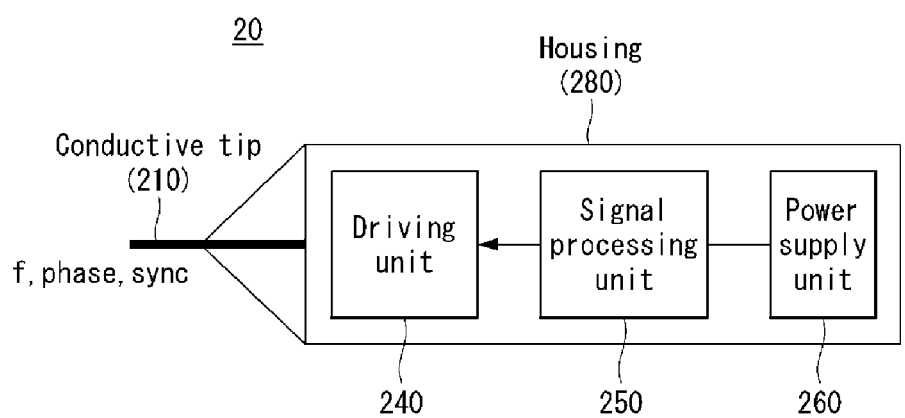
FIG. 6 is a diagram illustrating schematically a configuration of a passive stylus pen.
Figure 7:
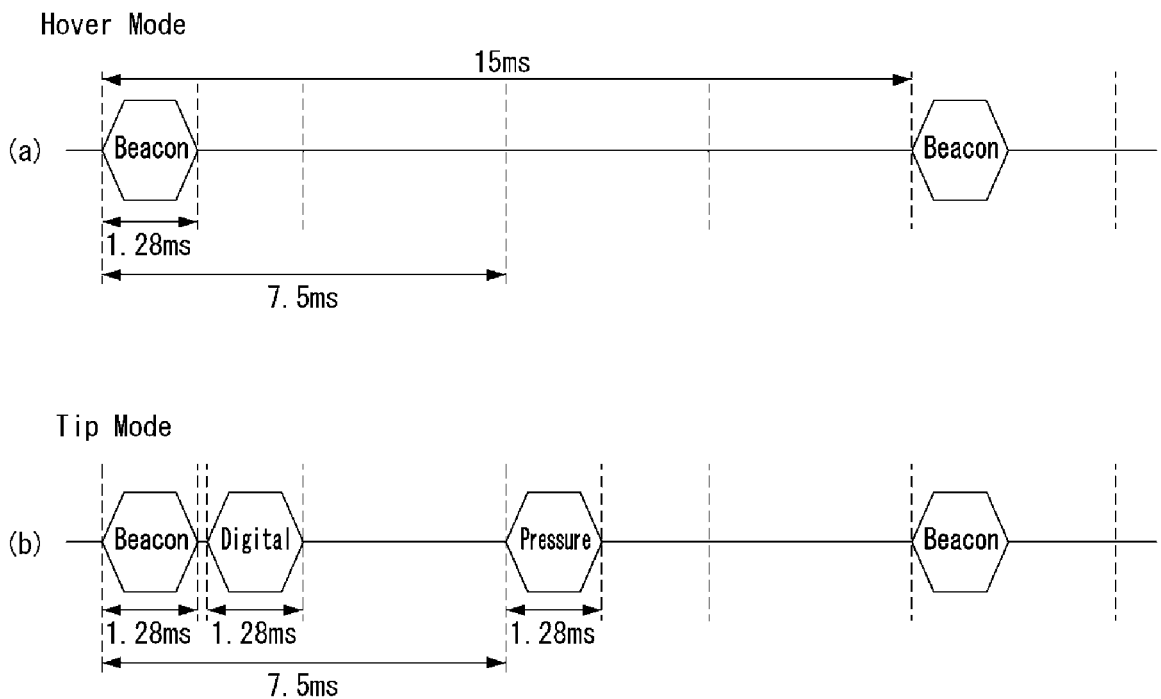
FIG. 7 is an exemplary diagram of a pen signal output from a passive stylus pen.
Figure 8:
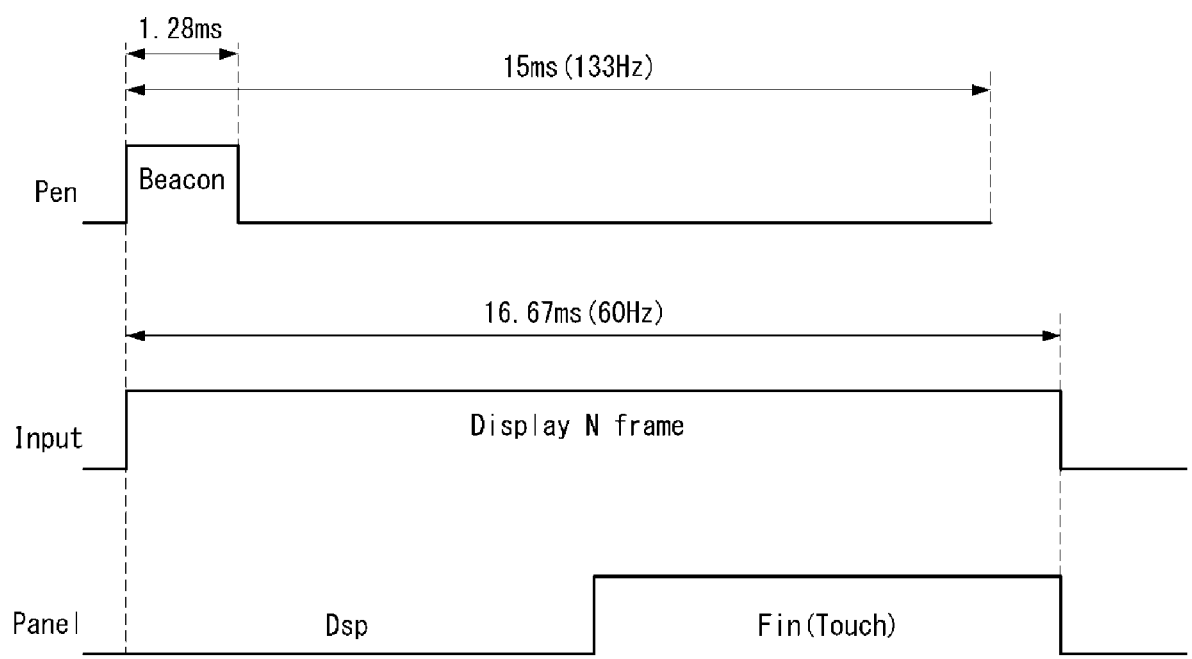
FIG. 8 is a diagram for explaining a recognition error problem of a stylus pen.

FIG. 5 is a diagram illustrating schematically a configuration of an active stylus pen. FIG. 6 is a diagram illustrating schematically a configuration of a passive stylus pen. FIG. 7 is an exemplary diagram of a pen signal output from a passive stylus pen. FIG. 8 is a diagram for explaining a recognition error problem of a stylus pen.

A stylus pen 20 is implemented as an active stylus pen (bidirectional communication system) as shown in FIG. 5 or a passive stylus pen (unidirectional communication system) as shown in FIG. 6. The active stylus pen (two-way pen) 20 of FIG. 5 has a bidirectional communication system, and exchanges data and the like with an electronic device 10 having a touch sensor by a bidirectional communication method. The passive stylus pen (one-way pen) 20 of FIG. 6 has a unidirectional communication system, and only transmits data and the like to the electronic device 10 having a touch sensor.

The active stylus pen 20 of FIG. 5 has a housing 280, a power supply unit 260, a signal processing unit 250, a receiving unit 230, a driving unit 240, a switching unit 220 and a conductive tip 210. The passive stylus pen 20 of FIG. 6 has a housing 280, a power supply unit 260, a signal processing unit 250, a driving unit 240, and a conductive tip 210. Hereinafter, configuration of the stylus pen 20 will be schematically described as follows.

The housing 280 accommodates components constituting the stylus pen 20. The power supply unit 260 supplies power to the components that operate the stylus pen 20. The signal processing unit 250 generates and processes a pen signal input/output from the stylus pen 20. The receiving unit 230 receives a signal for interlocking with an external device. The driving unit 240 drives the pen signal generated from the signal processing unit 250 through the conductive tip 210. The switching unit 220 switches the input/output of the stylus pen 20. The conductive tip 210 is made of a conductive material such as a metal to serve as a receiving electrode and a transmitting electrode.

The stylus pen 20 transmits (or outputs) the pen signal generated from the signal processing unit 250 through the conductive tip 210 when the conductive tip 210 is positioned on or in contact with the touch screen TSP. The pen signal outputted from the conductive tip 210 includes frequency information (f), phase information (phase), a synchronizing signal (sync) and data of the stylus pen 20.

As shown in FIG. 7, the passive stylus pen 20 may operate in a hover mode in (a) of FIG. 7 and a tip mode in (b) of FIG. 7. The hover mode in (a) of FIG. 7 is a driving mode when the stylus pen 20 is positioned on the touch screen TSP. The tip mode in (b) of FIG. 7 is a driving mode when the stylus pen 20 is in contact with the touch screen TSP.

During operation in the hover mode, the stylus pen 20 outputs only a beacon signal (Beacon). The beacon signal (Beacon) includes frequency information, a synchronization signal, and the like. During operation in the tip mode, the stylus pen 20 continuously outputs a beacon signal (Beacon) and a digital signal (Digital), and then outputs a pressure signal (Pressure) after a predetermined delay time. The digital signal (Digital) includes frequency information and phase information, and the like. The pressure signal includes data and the like capable of providing information on a position of the stylus pen 20.

On the other hand, as shown in FIGS. 5 and 6, a difference between the active stylus pen 20 and the passive stylus pen 20 is a difference between whether the data transmission and reception is bidirectional or unidirectional. In an instance of the active stylus pen 20, mutual communication with the electronic device 10 having a touch sensor is possible, so that a driving frequency or a driving cycle of the display panel DIS can be matched. In contrast, in an instance of the passive stylus pen 20, since it is impossible to communicate with the electronic device 10 having a touch sensor, the driving frequency or the driving cycle of the display panel (DIS) is not matched, so that problems such as a touch input error (or a recognition error) or a coordinate calculation error may be caused.

Hereinafter, a reason why the above-described problem may occur in the electronic device 10 having a touch sensor will be described with examples as the following.

As shown in FIG. 8, since the driving frequency of the passive stylus pen is 133 Hz, the pen signal Pen output from the passive stylus pen can set a period of about 15 ms as one cycle. At this time, the beacon signal (Beacon) can be output for 1.28 ms. On the other hand, since the driving frequency of the electronic device having a touch sensor is 60 Hz, Nth frame video data (Display N frame) can set a period of 16.67 ms as one frame.

During a period in which the Nth frame video data (Display N frame) is input (see Input, Input is the input video data), the display panel (See Panel, Panel is a control signal for synchronization of the display panel and the touch screen) having a touch screen operates by being divided into a display driving period (Dsp) and a touch sensor driving period (Fin(Touch)).

As in the above example, the driving frequency or the driving cycle is not matched between the passive stylus pen and the electronic device having a touch sensor. For this reason, when bidirectional data communication is not possible like the passive stylus pen, problems such as a touch input error (or a recognition error) or a coordinate calculation error occur.

Hereinafter, an embodiment of the invention for solving or addressing a problem that may occur between the passive stylus pen 20 and the electronic device 10 having a touch sensor will be described.

Figure 9:
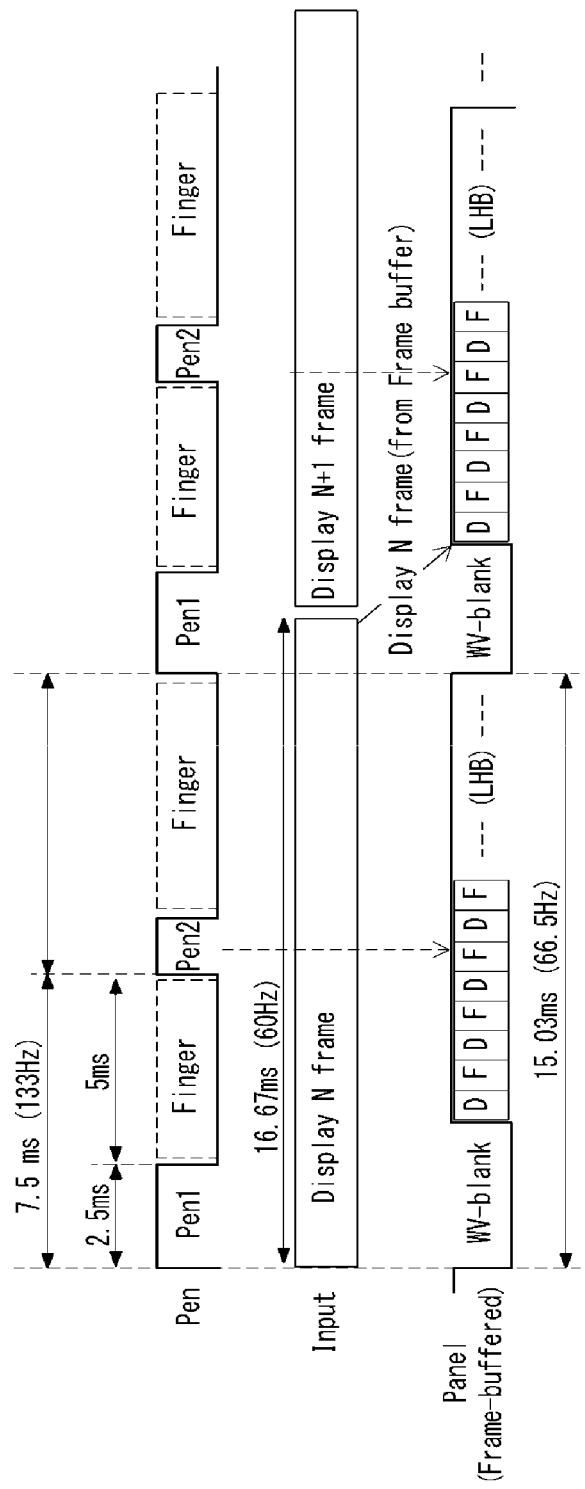
FIG. 9 is a waveform diagram schematically illustrating a driving method of a passive stylus pen and an electronic device having a touch sensor according to a first embodiment of the invention.
Figure 10:
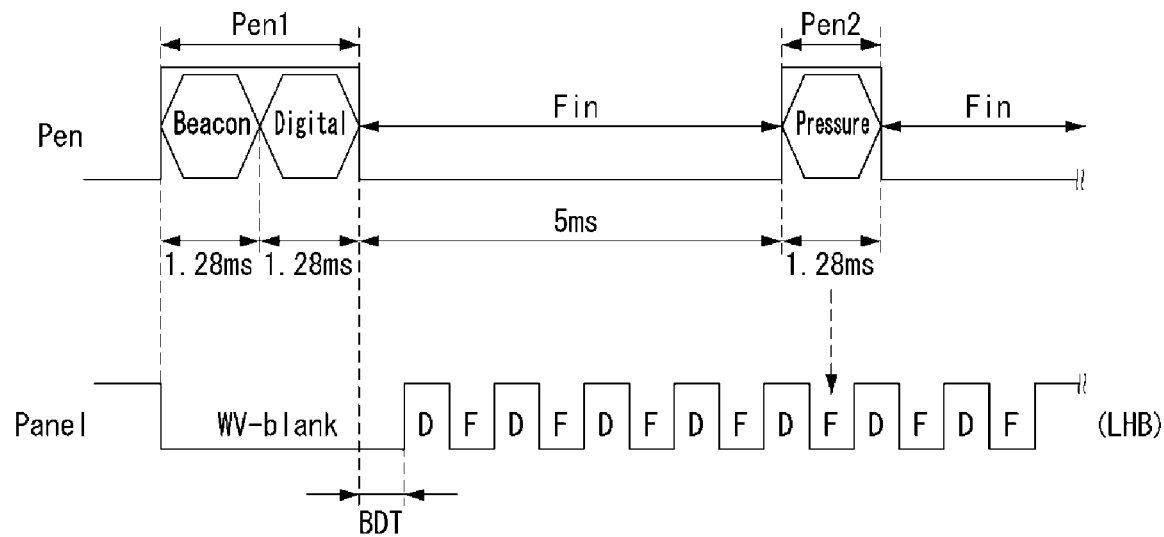
FIG. 10 is a waveform diagram more specifically illustrating a part of a waveform of FIG. 9.

FIG. 9 is a waveform diagram schematically illustrating a driving method of a passive stylus pen and an electronic device having a touch sensor according to a first embodiment of the invention. FIG. 10 is a waveform diagram more specifically illustrating a part of a waveform of FIG. 9.

As shown in FIGS. 9 and 10, a passive stylus pen has a first pen signal output period (Pen1), and then a second pen signal output period (Pen2) after a predetermined delay time. There is no pen signal Pen substantially output during a period between the first pen signal output period (Pen1) and the second pen signal output period (Pen2) (a separation period between the two signals). However, the period existing between the first pen signal output period (Pen1) and the second pen signal output period (Pen2) corresponds to a period for sensing a human finger when viewed from a viewpoint of an electronic device having a touch sensor.

Therefore, a finger sensing period (Finger) existing between the first pen signal output period (Pen1) and the second pen signal output period (Pen2) may be defined as a period for sensing a finger. On the other hand, the first pen signal output period (Pen1) and the second pen signal output period (Pen2) are continuously output as shown in FIG. 9 while the passive stylus pen is in contact with the electronic device having a touch sensor.

The first pen signal output period (Pen 1) includes a beacon signal (Beacon) and a digital signal (Digital). The beacon signal (Beacon) and the digital signal (Digital) may be allocated to approximately 1.28 ms, respectively. The second pen signal output period (Pen2) includes a pressure signal (Pressure). The pressure signal (Pressure) may be allocated to approximately 1.28 ms. The finger sensing period (Finger) existing between the first pen signal output period (Pen1) and the second pen signal output period (Pen2) may be allocated to 5 ms.

When the passive stylus pen is outputting the pen signal at the above-mentioned cycle, digital video data is input (see Input) in a unit of frame in a order of an Nth frame video data (Display N frame), an (N+1)th frame video data (Display N+1 frame), and so on in the electronic device having a touch sensor.

As described above, the passive stylus pen may have a driving frequency of 133 Hz. The first pen signal output period (Pen1) is approximately 2.5 ms and the period between the first pen signal output period (Pen1) and the second pen signal output period (Pen2) is approximately 5 ms. That is, the finger sensing period (Finger) is performed for a period of approximately 5 ms.

The finger sensing period (Finger) after the first pen signal output period (Pen1) and a finger sensing period (Finger) after the second pen signal output period (Pen2) may be set to be half of one cycle of the pen signal (Pen) of the passive stylus pen. Therefore, one cycle of the pen signal (Pen) of the passive stylus pen takes about 15 ms.

Since the driving frequency of the electronic device having a touch sensor is 60 Hz, the Nth frame video data (Display N frame) can set a period of 16.67 ms as one frame. During a period in which the Nth frame video data (Display N frame) is input, the control signal (Panel) of the display panel having a touch screen operates by being divided into a display driving period (D) and a touch sensor driving period (F).

The first embodiment of the invention stores frame video data input at a driving frequency of 60 Hz in a frame buffer (Frame-buffered) in order to drive the display panel having a touch screen in synchronization with the driving frequency (133 Hz) of the pen signal (Pen) of the passive stylus pen. Then, the first embodiment of the invention drives the display panel having a touch screen at a driving frequency of 66.5 Hz, which is a half cycle of the pen signal of the passive stylus pen. That is, the first embodiment of the invention synchronizes the driving frequency of the display panel having a touch screen to a half of the driving frequency of the passive stylus pen. On the other hand, since the frame video data is output after being stored in the frame buffer (Frame-buffered), the frame video data is displayed on the display panel having a touch screen after being delayed by one frame period.

Further, in order to easily recognize the pen signals (Pen1) (corresponding to Pen1 and Pen2) of the passive stylus pen, the first embodiment of the invention extends a vertical blanking period (extending about 3 ms compared to before use of the passive stylus pen) and synchronizes the first pen signal (corresponding to Pen1) to an extended vertical blanking period (WV-blank). During a remaining period (12 ms) except for the extended vertical blanking period (WV-blank), the display driving period D and the touch sensor driving period F of the display panel having a touch screen are alternately operated in two or more times.

The extended vertical blanking period (WV-blank) has a period corresponding to the first pen signal output period (Pen1). Specifically, a falling edge period (a start period of WV-blank) of the extended vertical blanking period (WV-blank) may be synchronized with a rising edge period (a start period of Pen1) of the first pen signal output period (Pen1). Then, a rising edge period (an end period of WV-blank) of the extended vertical blanking period (WV-blank) may have a delay time (BDT) delaying the end period so as to the rising edge period (the end period of WV-blank) of the extended vertical blanking period (WV-blank) occurs later than a falling edge period (an end period of Pent) of the first pen signal output period (Pen1).

A driving method in which the display driving period D and the touch sensor driving period F are alternated many times for one frame is defined as a long horizontal blanking (LHB) period method because of having a long horizontal blanking period. There are many touch sensor driving periods F in the LHB period in which the display driving period D and the touch sensor driving period F are alternated many times, so that not only a touch by the human finger but also a touch by the passive stylus pen are recognized. On the other hand, in FIG. 10, a logic high period corresponds to the display driving period D and a logic low period corresponds to the touch sensor driving period F. However, the invention is not limited thereto.

Hereinafter, other examples of achieving synchronization between a passive stylus pen and an electronic device having a touch sensor are described similarly/equally with the first embodiment of the invention. In the following description, however, only a relationship between the first pen signal output period (Pen1) of the passive stylus pen and the extended vertical blanking period (WV-blank) applied to the display panel having a touch sensor will be described.

Figure 11:
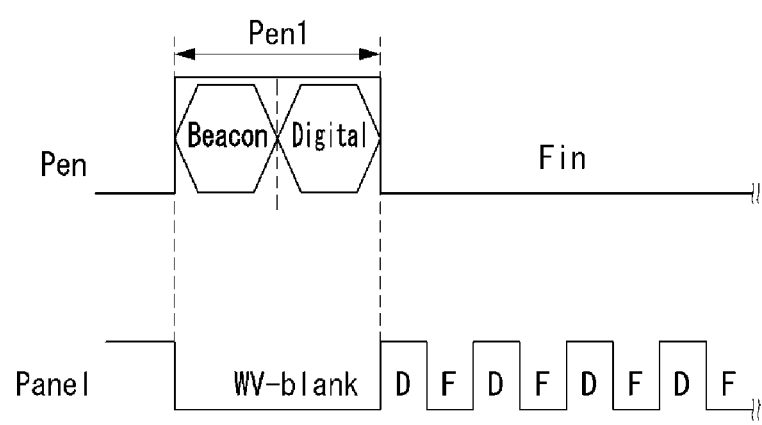
FIG. 11 is a waveform diagram schematically illustrating a driving method of a passive stylus pen and an electronic device having a touch sensor according to a second embodiment of the invention.
Figure 12:
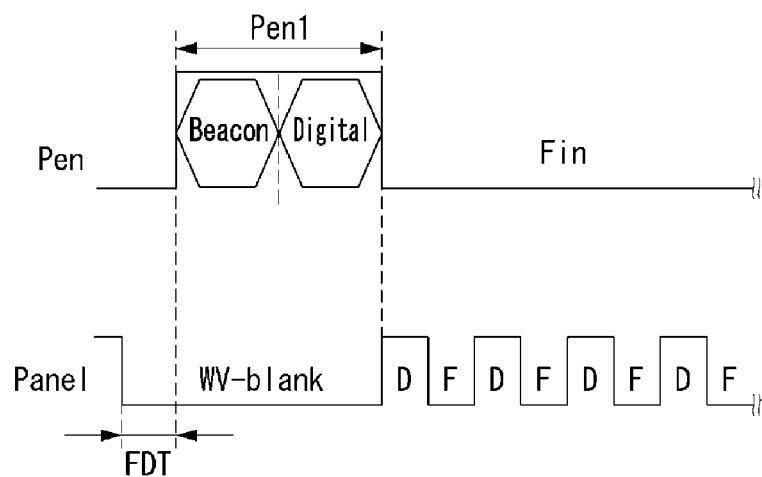
FIG. 12 is a waveform diagram schematically illustrating a driving method of a passive stylus pen and an electronic device having a touch sensor according to a third embodiment of the invention.
Figure 13:
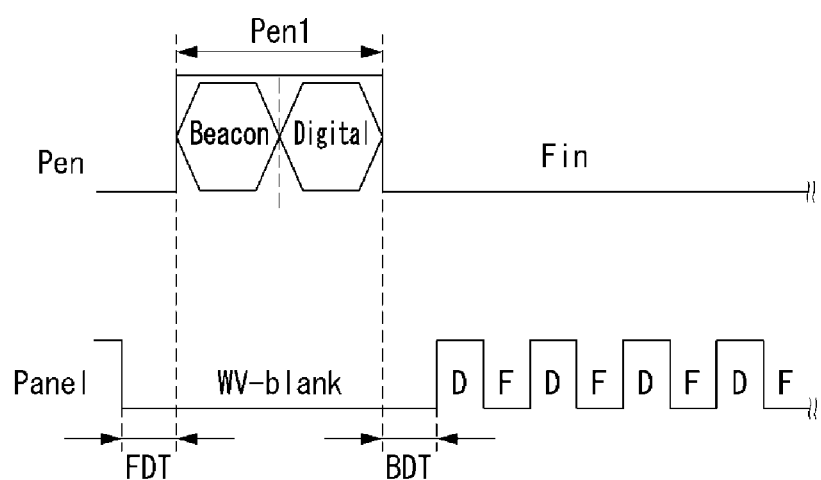
FIG. 13 is a waveform diagram schematically illustrating a driving method of a passive stylus pen and an electronic device having a touch sensor according to a fourth embodiment of the invention.
Figure 14:
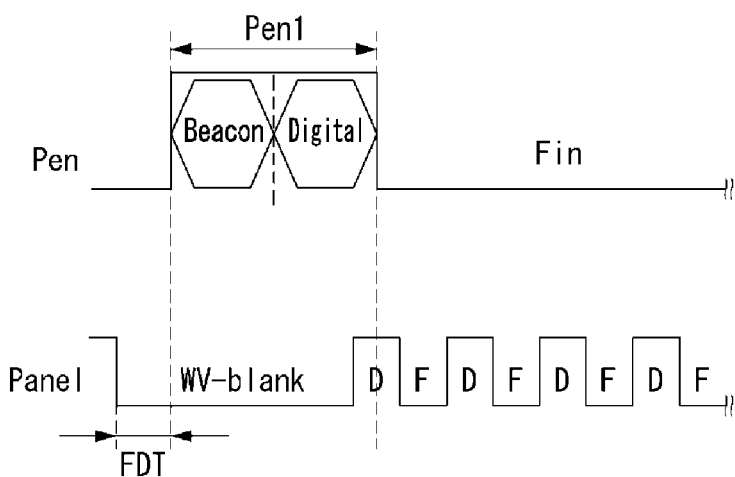
FIG. 14 is a waveform diagram schematically illustrating a driving method of a passive stylus pen and an electronic device having a touch sensor according to a fifth embodiment of the invention.

FIG. 11 is a waveform diagram schematically illustrating a driving method of a passive stylus pen and an electronic device having a touch sensor according to a second embodiment of the invention. FIG. 12 is a waveform diagram schematically illustrating a driving method of a passive stylus pen and an electronic device having a touch sensor according to a third embodiment of the invention. FIG. 13 is a waveform diagram schematically illustrating a driving method of a passive stylus pen and an electronic device having a touch sensor according to a fourth embodiment of the invention. FIG. 14 is a waveform diagram schematically illustrating a driving method of a passive stylus pen and an electronic device having a touch sensor according to a fifth embodiment of the invention.

As shown in FIG. 11, a falling edge period (a start period of WV-blank) of an extended vertical blanking period (WV-blank) may be synchronized with a rising edge period (a start period of Pen1) of a first pen signal output period (Pen1). A rising edge period (an end period of WV-blank) of the extended vertical blanking period (WV-blank) may be synchronized with a falling edge period (an end period of Pen1) of the first pen signal output period (Pen1). As described above, according to the second embodiment, the extended vertical blanking period (WV-blank) and the first pen signal output period (Pen1) can have a synchronized form such that the start period and the end period coincide with each other.

As shown in FIG. 12, a falling edge period (a start period of WV-blank) of an extended vertical blanking period (WV-blank) may have an advanced period (FDT) that pulls the start period so that the falling edge period (a start period of WV-blank) of the extended vertical blanking period (WV-blank) occurs before a rising edge period (a start period of Pen1) of a first pen signal output period (Pen1). A rising edge period (an end period of WV-blank) of the extended vertical blanking period (WV-blank) may be synchronized with a falling edge period (an end period of Pent) of the first pen signal output period (Pen1). As described above, according to the third embodiment, the extended vertical blanking period (WV-blank) and the first pen signal output period (Pen1) can have a synchronized form such that only the end period is matched.

As shown in FIG. 13, a falling edge period (a start period of WV-blank) of an extended vertical blanking period (WV-blank) may have an advanced period (FDT) that pulls the start period so that the falling edge period (a start period of WV-blank) of the extended vertical blanking period (WV-blank) occurs before a rising edge period (a start period of Pen1) of a first pen signal output period (Pen1). A rising edge period (an end period of WV-blank) of the extended vertical blanking period (WV-blank) may have a delay time (BDT) that delays the end period so that the rising edge period (an end period of WV-blank) of the extended vertical blanking period (WV-blank) occurs later than a falling edge period (an end period of Pent) of the first pen signal output period (Pen1). As described above, according to the fourth embodiment, the extended vertical blanking period (WV-blank) does not coincide with the start period and the end period of the first pen signal output period Pen1. However, the extended vertical blanking period (WV-blank) can have a form that starts earlier and ends later than these periods.

On the other hand, as in the fourth embodiment, if a width of the extended vertical blanking period (WV-blank) is wider than a width of the first pen signal output period (Pen1), a margin for achieving synchronization is wider, which is more advantageous for synchronization. Therefore, the passive stylus pen and the electronic device having a touch sensor can further increase probability of solving problems such as a recognition error or a coordinate calculation error of the stylus pen.

As shown in FIG. 14, a falling edge period (a start period of WV-blank) of an extended vertical blanking period (WV-blank) may have an advanced period (FDT) that pulls the start period so that the falling edge period (a start period of WV-blank) of the extended vertical blanking period (WV-blank) occurs before a rising edge period (a start period of Pen1) of a first pen signal output period (Pen1). A rising edge period (an end period of WV-blank) of the extended vertical blanking period (WV-blank) may be pulled up to the end period so that the rising edge period (an end period of WV-blank) of the extended vertical blanking period (WV-blank) occurs before a falling edge period (an end period of Pen1) of the first pen signal output period (Pen1). As described above, according to the fifth embodiment, the extended vertical blanking period (WV-blank) does not coincide with the start period and the end period of the first pen signal output period Pen1. However, the extended vertical blanking period (WV-blank) can have a form that starts earlier and ends sooner than these periods.

On the other hand, as in the fifth embodiment, the rising edge period (an end period of WV-blank) of the extended vertical blanking period (WV-blank) can occur before a rising edge period (a start period of Pen1) of the first pen signal output period (Pen1) because frequency information is included in a beacon signal (Beacon). Therefore, synchronization can be achieved when the extended vertical blanking period (WV-blank) is wider than a width of the beacon signal (Beacon) included in the first pen signal output period (Pen1). However, probability of solving problems such as a recognition error or a coordinate calculation error of the stylus pen is somewhat lower than other embodiments.

In the above description, a driving cycle between the stylus pen and a display device having a touch screen is synchronized in such a manner that the first pen signal output period (Pen1) and the extended vertical blanking period (WV-blank) are synchronized. However, the invention is not limited thereto.

In order to address the above-mentioned limitations, the invention changes the driving period (driving cycle) of the display panel and secures time for receiving a signal output from the passive stylus pen 20. Hereinafter, a configuration and a method of a device for achieving the above-described embodiments of the invention will be described.

Figure 15:
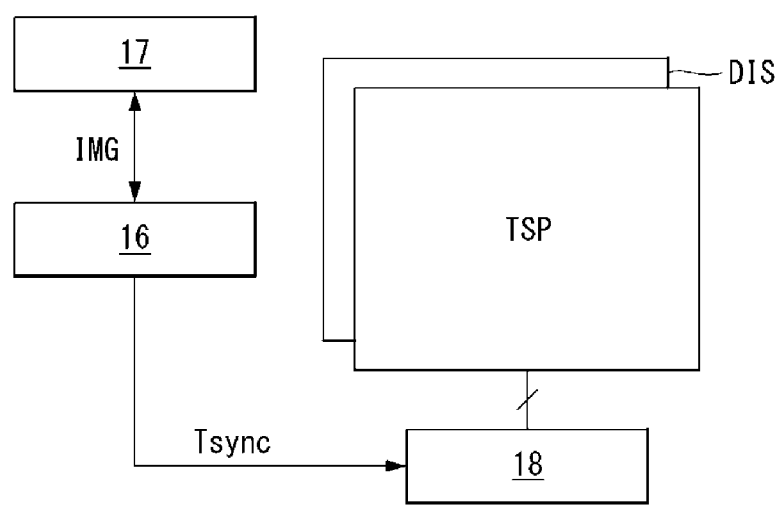
FIG. 15 is an exemplary configuration diagram of a device for achieving embodiments of the invention.

FIG. 15 is an exemplary configuration diagram of a device for achieving embodiments of the invention.

As shown in FIG. 15, the embodiments of the invention basically provide a frame memory 17, a timing controller 16, a touch driver 18, and a display panel DIS having a touch screen TSP.

When a stylus pen is positioned on the touch screen TSP and frame video data IMG is input from outside, the timing controller 16 stores the frame video data IMG in the frame memory 17 in response to a user's input (for example, switching to a passive stylus pen use mode). Synchronization between the stylus pen and a display device having a touch screen occurs from a moment the stylus pen is positioned on the touch screen TSP. In an instance of receiving the input from the user, it may be omitted after a mode for using the passive stylus pen has already been determined.

The timing controller 16 generates and outputs a control signal Tsync for controlling the touch driver 18 and the display panel DIS having the touch screen TSP with a driving cycle (or driving frequency) that can be synchronized with a driving cycle (or driving frequency) of the stylus pen in response to a user's selection (for example, a driving frequency of the passive stylus pen). The timing controller 16 generates and outputs a control signal Tsync for alternating a display driving period and a touch sensor driving period. This step is corresponds to a step of generating and outputting a control signal for synchronization.

Specifically, in order to synchronize with the stylus pen, the timing controller 16 generates and outputs a control signal Tsync in a form in which the extended vertical blanking period in which a vertical blanking period is extended and the display driving period and the touch sensor driving period which alternate in two or more times for one frame are combined. The timing controller 16 loads the frame video data IMG stored in the frame memory 17 after outputting the control signal Tsync, and outputs the frame video data IMG to the data driver.

The timing controller 16 may generate and output the control signal Tsync in one of the first to fifth embodiments shown in FIGS. 10 to 14. However, in order to solve the problem caused by noise as well as the recognition error of the stylus pen, it is possible to change and output the control signal Tsync in one of the first to fifth embodiments corresponding to the user's environmental condition. That is, the timing controller 16 may achieve synchronization with the stylus pen in an adaptive frequency changing manner. In this instance, the driving frequency or driving cycle between the stylus pen and the display device having the touch screen is adaptively synchronized, so that a recognition rate and an accuracy of coordinate calculation of the stylus pen can be increased.

As described above, the embodiments of the invention have an effect of synchronizing the driving frequency or the driving cycle between the stylus pen and the display device having the touch screen. In addition, the embodiments of the invention have an effect of solving or addressing the problems of the recognition error or the coordinate calculation error of the stylus pen caused by the difference of the driving frequency or the driving cycle between the stylus pen and the display device having the touch screen. Further, the embodiments of the invention have an effect of increasing the recognition rate and the accuracy of coordinate calculation by adaptively synchronizing the driving frequency or the driving cycle between the stylus pen and the display device having the touch screen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device having a touch sensor, the electronic device comprising:
   a display panel having a touch screen;
   a touch driver configured to drive the touch screen;
   a timing controller configured to control the display panel and the touch driver; and
   a stylus pen configured to provide a signal to the touch screen,
   wherein the timing controller, in order to synchronize with the stylus pen, is further configured to output a control signal having an extended vertical blanking period corresponding to a first pen signal output period of the stylus pen, a plurality of display driving periods, and a plurality of touch sensor driving periods, for one frame period,
   wherein one display driving period and one touch sensor driving period alternate in two or more times, and
   wherein a falling edge of the extended vertical blanking period occurs before a rising edge of the first pen signal output period of the stylus pen.

2. The electronic device of claim 1, wherein a signal in the first pen signal output period of the stylus pen includes a beacon signal including frequency information and a synchronization signal of the stylus pen, and a digital signal including frequency information and phase information of the stylus pen.

3. The electronic device of claim 1, wherein a rising edge period of the extended vertical blanking period is synchronized with a falling edge period of the first pen signal output period of the stylus pen.

4. The electronic device of claim 1, wherein a rising edge period of the extended vertical blanking period occurs later than a falling edge period of the first pen signal output period of the stylus pen.

5. The electronic device of claim 1, wherein a rising edge period of the extended vertical blanking period occurs before a falling edge period of the first pen signal output period of the stylus pen.

6. The electronic device of claim 1, wherein the stylus pen further includes a second pen signal output period, and
   the first pen signal output period and the second pen signal output period are separated with a predetermined delay time.

7. A method of driving an electronic device having a touch sensor including a display panel having a touch screen, a touch driver configured to drive the touch screen, a timing controller configured to control the display panel and the touch driver, and a stylus pen configured to provide a signal to the touch screen, the method comprising:
- when the stylus pen is positioned on the touch screen and frame video data is input from outside, storing the frame video data in a frame memory, and outputting a control signal for synchronization with the stylus pen,
- wherein the control signal has an extended vertical blanking period corresponding to a first pen signal output period of the stylus pen, a plurality of display driving periods, and a plurality of touch sensor driving periods, for one frame period,
- wherein one display driving period and one touch sensor driving period alternate in two or more times, and
- wherein a falling edge of the extended vertical blanking period occurs before a rising edge of the first pen signal output period of the stylus pen.

8. The method of claim 7, wherein a signal in the first pen signal output period of the stylus pen includes a beacon signal including frequency information and a synchronization signal of the stylus pen, and a digital signal including frequency information and phase information of the stylus pen.

9. The method of claim 7, wherein a rising edge period of the extended vertical blanking period is synchronized with a falling edge period of the first pen signal output period of the stylus pen.

10. The method of claim 7, wherein a rising edge period of the extended vertical blanking period occurs later than a falling edge period of the first pen signal output period of the stylus pen.

11. The method of claim 7, wherein a rising edge period of the extended vertical blanking period occurs before a falling edge period of the first pen signal output period of the stylus pen.

* * * * *